(12) United States Patent
Reubeuze et al.

(10) Patent No.: US 7,168,764 B2
(45) Date of Patent: Jan. 30, 2007

(54) HINGE MECHANISM FOR A VEHICLE SEAT, AND A VEHICLE SEAT EQUIPPED WITH SUCH A MECHANISM

(75) Inventors: Yann Reubeuze, Landigou (FR); François Baloche, La Carneille (FR)

(73) Assignee: Faurecia Sieges d'Automobile SA, Nanterre (FR)

( * ) Notice: Subject to any disclaimer, the term of this patent is extended or adjusted under 35 U.S.C. 154(b) by 366 days.

(21) Appl. No.: 10/623,925

(22) Filed: Jul. 21, 2003

(65) Prior Publication Data

US 2004/0061369 A1 Apr. 1, 2004

(30) Foreign Application Priority Data

Jul. 25, 2002 (FR) .................................. 02 09440

(51) Int. Cl.
*B60N 2/02* (2006.01)
(52) U.S. Cl. ..................................... 297/367
(58) Field of Classification Search ................ 297/367
See application file for complete search history.

(56) References Cited

U.S. PATENT DOCUMENTS

| | | | | |
|---|---|---|---|---|
| 4,348,050 A | | 9/1982 | Letournoux et al. ........ 297/365 |
| 4,523,786 A | | 6/1985 | Letournoux et al. ........ 297/367 |
| 4,770,464 A | | 9/1988 | Pipon et al. ................. 297/367 |
| 6,007,152 A | * | 12/1999 | Kojima et al. .............. 297/367 |
| 6,007,153 A | * | 12/1999 | Benoit et al. ........... 297/367 X |
| 6,095,608 A | * | 8/2000 | Ganot et al. ................ 297/367 |
| 6,164,723 A | * | 12/2000 | Ganot ..................... 297/367 X |
| 6,325,458 B1 | * | 12/2001 | Rohee et al. ............... 297/367 |
| 6,402,249 B1 | * | 6/2002 | Rohee et al. ............... 297/367 |
| 6,474,740 B1 | * | 11/2002 | Kondo et al. ............... 297/367 |
| 6,554,361 B2 | * | 4/2003 | Reubeuze et al. ......... 297/367 |
| 2001/0001220 A1 | * | 5/2001 | Rohee et al. ............... 297/367 |
| 2002/0017811 A1 | | 2/2002 | Cilliere et al. ............. 297/367 |
| 2002/0043856 A1 | * | 4/2002 | Ikegaya ..................... 297/367 |
| 2002/0053825 A1 | * | 5/2002 | Reubeuze et al. ......... 297/367 |
| 2002/0171280 A1 | * | 11/2002 | Okazaki et al. ............ 297/367 |

FOREIGN PATENT DOCUMENTS

| | | |
|---|---|---|
| EP | 0 023 863 | 2/1981 |
| EP | 0 250 290 | 12/1987 |
| FR | 2 530 436 | 1/1984 |
| FR | 2 806 981 | 10/2001 |

* cited by examiner

Primary Examiner—Rodney B. White
(74) Attorney, Agent, or Firm—McCracken & Frank LLP

(57) ABSTRACT

A hinge mechanism for a vehicle seat, said hinge mechanism comprising first and second cheek plates mounted to pivot about a common pivot axis, N locking members, each of which is provided with a second set of teeth, N guides secured to the first cheek plate, and a control device adapted to place the N locking members either in an active position, or in a retracted position, (N-1) guides being disposed in a manner such that the (N-1) locking members move along (N-1) respective axes of displacement that coincide with (N-1) radial directions, the last guide being disposed in a manner such that its locking member moves along an axis of displacement that is parallel to and offset relative to a radial direction that intersects the pivot axis.

6 Claims, 3 Drawing Sheets

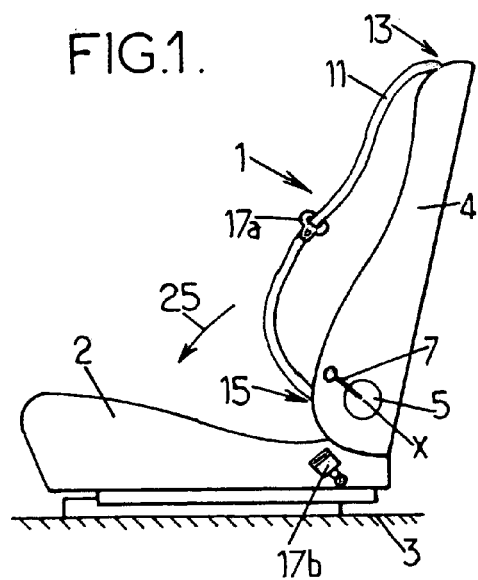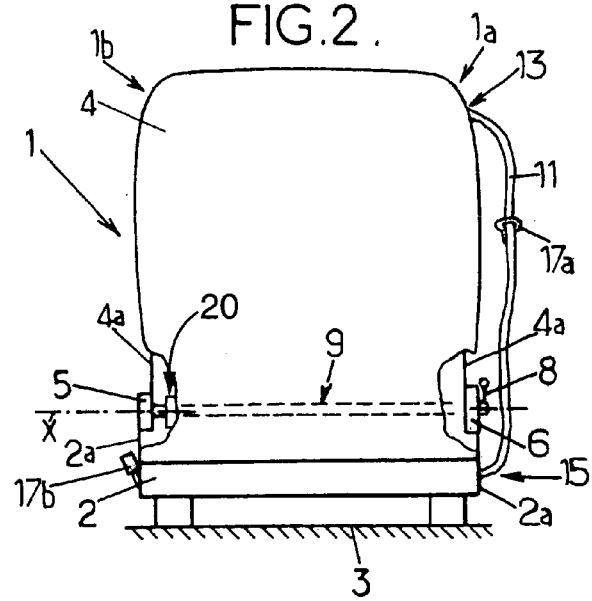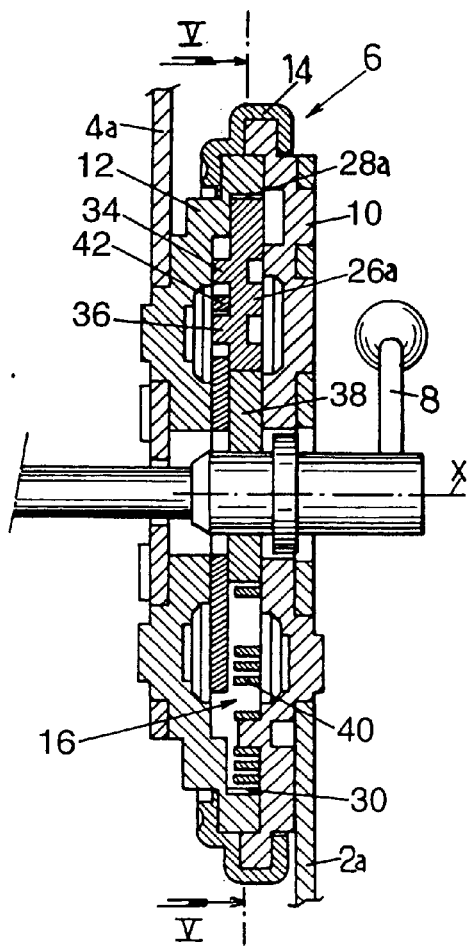

HINGE MECHANISM FOR A VEHICLE SEAT, AND A VEHICLE SEAT EQUIPPED WITH SUCH A MECHANISM

FIELD OF THE INVENTION

The present invention relates to hinge mechanisms for vehicle seats and to seats equipped with such mechanisms.

More particularly, among such hinge mechanisms, the invention relates to those that comprise:

- first and second cheek plates mounted to pivot relative to each other about a common pivot axis, the second cheek plate being provided with a first set of teeth forming at least an arc of a circle centered on the pivot axis;
- N locking members, each of which is provided with a second set of teeth having an angular pitch identical to the angular pitch of the first set of teeth, each locking member being mounted to move on the first cheek plate between firstly an active position in which the second set of teeth of each locking member is in engagement with the first set of teeth of the second cheek plate so as to prevent the first and second cheek plates from moving relative to each other, and secondly a retracted position in which the second set of teeth of each locking member does not co-operate with the first set of teeth of the second cheek plate so as to enable the first and second cheek plates to pivot relative to each other;
- N guides secured to the first cheek plate, each guide being associated with a locking member and serving to guide said locking member with operating clearance, said locking member following an axis of displacement that is substantially rectilinear between the active and the retracted positions; and
- a control device adapted to place the N locking members either in the active position, or in the retracted position.

BACKGROUND OF THE INVENTION

Document EP-A-0 250 290 describes an example of such a hinge mechanism which gives complete satisfaction. In that hinge mechanism, there is an asymmetrical offset between two locking members relative to a third locking member, so that the second set of teeth on each of the two angularly offset locking members come to engage partially in the first set of teeth on the second cheek plate. That angular offset between two slugs makes its possible to take up operating clearance between the first cheek plate and the second cheek plate in order to improve the comfort of an occupant seated in a seat equipped with such a mechanism. However, that asymmetrical offset between the two locking members prevents the teeth on the two locking members from ever coming fully into engagement with the teeth in the set of teeth on the second cheek plate, which gives rise to loss of strength for the hinge mechanism as a whole.

In view of the tendency for safety standards to become increasingly strict, it is essential to increase further the strength of hinge mechanisms of the type mentioned above, in order to prevent, as far as possible, such mechanisms from breaking in the event of an accident, in particular when said hinge mechanisms are subjected to rotary torque that is particularly high.

OBJECTS AND SUMMARY OF THE INVENTION

A particular object of the present invention is to mitigate the above-mentioned drawbacks.

To this end, according to the invention, in a hinge mechanism of the type in question, (N-1) guides are disposed in a manner such that (N-1) locking members that are associated with them move along (N-1) respective axes of displacement that coincide with (N-1) radial directions which intersect the pivot axis, and the last guide is disposed in a manner such that the locking member that is associated with it moves along an axis of displacement that is parallel to and offset relative to a radial direction that intersects the pivot axis.

By means of these provisions, only the last locking member that has an axis of displacement which is parallel to and offset relative to the radial direction engages partially in the first set of teeth on the second cheek plate, whereas the (N-1) other locking members can mesh fully with the set of teeth of said second cheek plate. This thus makes it possible to restrict the partial engagement of locking members in the set of teeth of the second cheek plate to a single locking member, which makes it possible to increase the strength of the hinge mechanism while also taking up the operating clearance between the first and the second cheek plates in said mechanism.

In preferred embodiments of the invention, it is optionally possible to use any of the following provisions:

- the (N-1) radial directions associated with the guides and the radial direction parallel to the axis of displacement of the last guide are uniformly angularly distributed about the pivot axis;
- the radial direction and the axis of displacement that are mutually parallel and that are associated with the last guide are separated by a distance greater than the operating clearance existing between said last guide and the locking member that is associated therewith;
- the radial direction and the axis of displacement that are mutually parallel and that are associated with the last guide are separated from each other by a distance no greater than the distance between two adjacent teeth in the first set of teeth of the second cheek plate; and
- the control device comprises:
    - a rotary cam which is resiliently urged towards a rest position in which said cam places each locking member in the active position; and
    - a control plate which is secured to the cam and which covers each locking member at least in part, said control plate being provided with cutouts adapted to co-operating with projecting pegs provided on each locking member in a manner such as to move each locking member simultaneously towards the retracted position when the cam is moved into an actuating position.

The invention also provides a vehicle seat comprising a seat proper and a seat back mounted to pivot relative to the seat proper by means of at least one hinge mechanism as defined above.

BRIEF DESCRIPTION OF THE DRAWINGS

Other characteristics and advantages of the invention appear from the following description of an embodiment of it, given by way of non-limiting example, and with reference to the accompanying drawings.

In the drawings:

FIGS. 1 and 2 are respectively a side view and a rear view of a vehicle seat equipped with at least one hinge mechanism of the invention;

FIG. 3 is a fragmentary vertical section view showing a hinge mechanism of the invention that connects the seat back to the seat proper of the seat in FIGS. 1 and 2;

in FIG. 4, a control plate is deliberately omitted in order to make the perspective clearer;

MORE DETAILED DESCRIPTION

Figure 4:
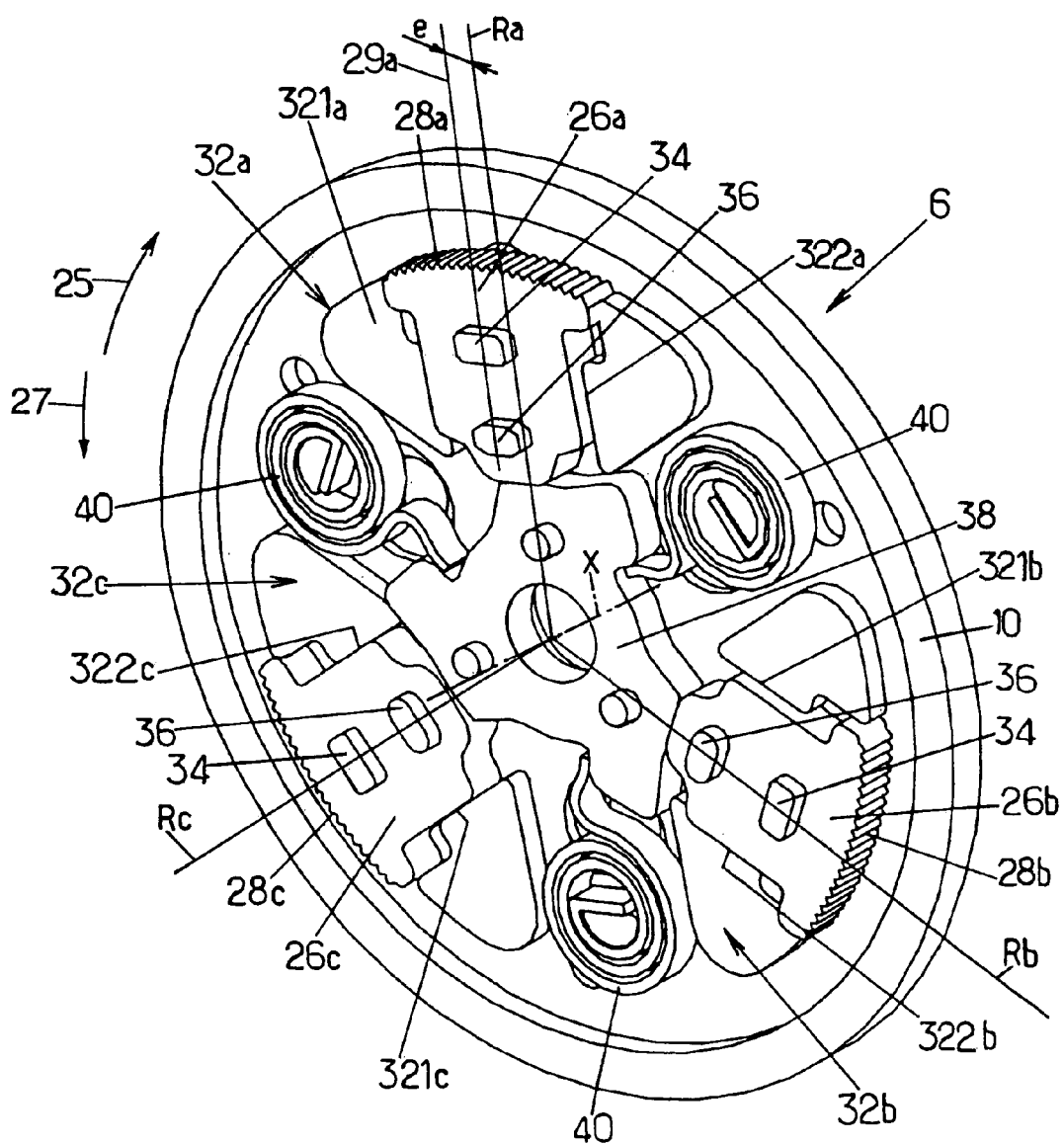
FIG. 4 is a perspective view showing a portion of the hinge mechanism that connects the seat back to the seat proper of the seat in FIGS. 1 and 2.

In the various figures, like references designate elements that identical or similar.

FIGS. 1 and 2 show a vehicle seat 1, in particular a motor vehicle front seat, which comprises firstly a seat proper 2 mounted on the floor 3 of the vehicle and secondly a seat back 4 mounted to pivot on the seat proper 2 about a transverse horizontal axis X.

More precisely, the rigid framework 4a of the seat back is connected to the rigid framework 2a of the seat proper by first and second hinge mechanisms 6, 5 which are situated on respective ones of first and second sides 1a, 1b of the seat, and which are controlled by a handle 8 situated on the first side 1a of the seat. The two hinge mechanisms are connected together via a coupling bar 9 that extends horizontally and transversely relative to the seat.

In addition, in the example considered herein, the seat is provided with a seatbelt 11 which is connected to the top portion of the seat back 4 and to the seat proper 2 at respective coupling points, namely a top coupling point 13 and a bottom coupling point 15, on the first side 1a of the seat. The seatbelt 11 is provided with a seatbelt buckle or segment 17a that is adapted to fasten removably in a latch 17b which is fixed, for example, to the seat proper on the second side 1b of the seat.

For example, the top coupling point 13 may be constituted by a guide at which the seatbelt 11 penetrates into the back of the seat, said seatbelt being deflected from the guide to a seatbelt reel situated inside the seat, optionally in a position remote from the top coupling point 13.

Thus, it can be understood that an occupant of the seat of the vehicle can exert relatively high rotary torque, in particular on the hinge mechanism 6 via the seat-mounted seatbelt 11, and in particular via its top fixing point 13.

Instead of being provided with two identical hinge mechanisms 5, 6, the seat 1 may also be provided with a single hinge mechanism, e.g. the hinge mechanism 6 that is situated on that side of the seat on which the top fixing point 13 of the seat-mounted seatbelt 11 is mounted.

As shown in more detail in FIG. 3, the hinge mechanism 6 comprises:

- a stationary metal cheek plate 10 which is secured to the rigid framework 2a of the seat proper 2;
- a moving metal cheek plate 12 which is secured to the framework 4a of the seat back;
- a metal band 14 which is crimped around the peripheries of the stationary and moving cheek plates 10, 12 while co-operating with them to define a closed circular housing; and
- a locking device 16 which is contained in the housing and which is adapted to prevent the moving cheek plate 12 from moving relative to the stationary cheek plate 10 so long as the handle 8 is not actuated.

Figure 5:
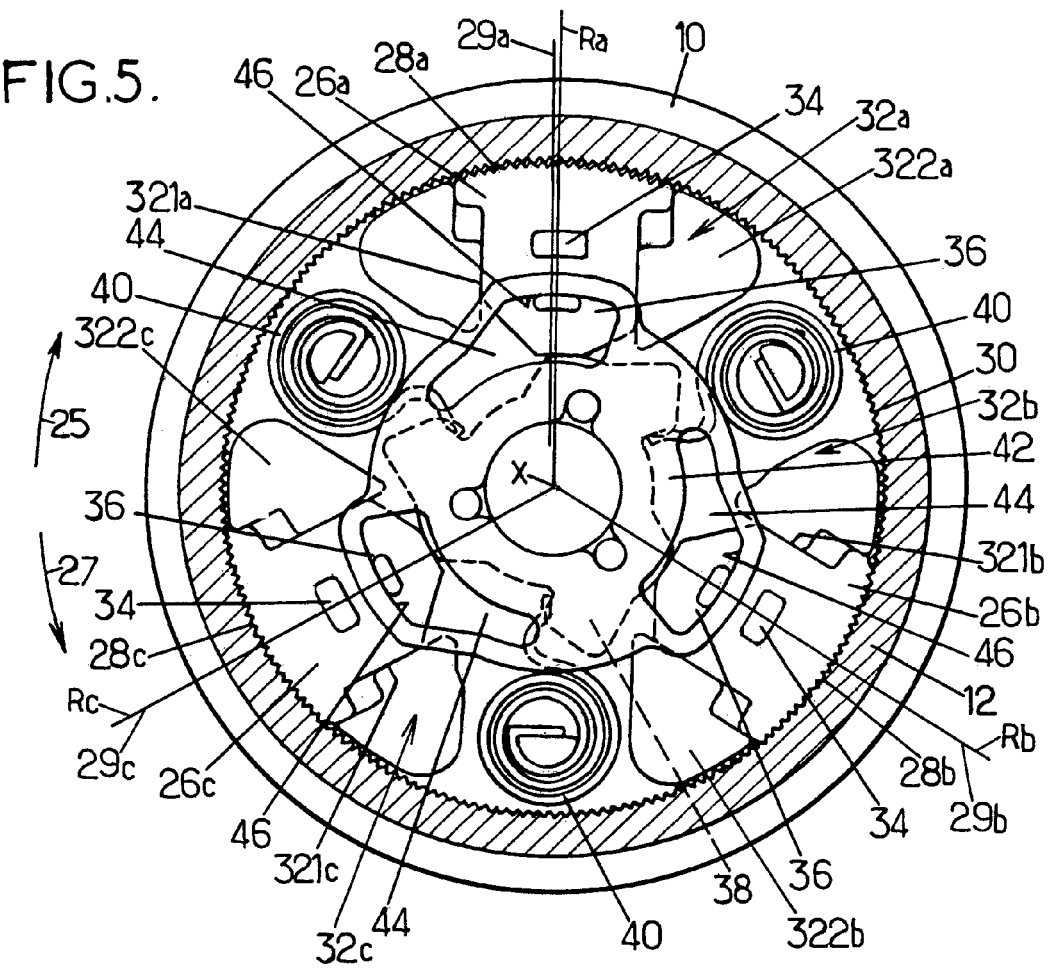
FIG. 5 is a section view on line V—V of FIG. 3, showing the hinge mechanism in its rest position.

The locking mechanism 16 is shown in more detail in FIGS. 4 and 5, and, in the example under consideration, comprises:

three metal locking members 26a, 26b, and 26c, each of which has an outwardly-directed set of teeth 28a, 28b, 28c adapted to come into engagement with an inwardly-directed circular set of teeth 30 centered on the pivot axis X and provided in the moving cheek plate 12; each of the locking members is mounted to slide along a respective rectilinear axis of displacement 29a, 29b, 29c inside a respective guide 32a, 32b, 32c which is secured to the stationary cheek plate 10, so that the locking members can be moved between firstly an active position in which the sets of teeth 28a 28b, 28c on said locking members are in engagement with the set of teeth 30 on the corresponding moving cheek plate 12 so as to lock said moving cheek plate relative to the stationary cheek plate 10, and secondly a retracted position in which the locking members do not co-operate with the set of teeth 30 on the moving cheek plate 12 and in which the locking members are spaced apart to the maximum extent from the set of teeth 30 on said moving cheek plate 12; each locking member is further provided with two pegs 34, 36 which project axially towards the moving cheek plate 12;

a metal cam 38 which is secured to the handle 8 and to the coupling bar 9, and which causes the locking members 26a, 26b, 26c to slide along their respective axes of displacement 29a, 29b, 29c;

springs 40 which are mounted on the stationary cheek plate 10, and which urge the cam 38 in the angular direction 27 towards a rest position in which said cam places the locking members 26a, 26b, 26c in their engagement active position, it being possible for said cam 38 to pivot in the angular direction 25 as far as an active position while enabling said locking members 26a, 26b, 26c to slide radially towards their fully retracted position, thereby unlocking the hinge mechanism, and thus thereby enabling the moving cheek plate 12 to pivot about the pivot axis X relative to the stationary cheek plate 10; and a control mask formed by a rigid metal plate 42 (shown in FIG. 5 only) which is connected rigidly to the cam 38 and which extends radially between said cam 38 and the moving cheek plate 12 while covering the locking members 26 in part, said plate being provided with three cutouts 44 in which the pegs 36 on the locking members 26a, 26b, 26c are engaged, each of the pegs 36 co-operating with a cam edge 46 which defines the corresponding cutout radially outwards and which is shaped to co-operate with the corresponding peg 36 so as to move the corresponding locking member 26a, 26b, 26c radially inwards when the cam 38 turns in the angular direction 25.

As can be seen in more detail in FIGS. 4 and 5, each locking member 26b, 26c is received in its corresponding guide 32b, 32c in a manner such that its axis of displacement 29b, 29c coincides with a radial direction Rb, Rc intersecting the pivot axis X that is common to the stationary cheek plate 10 and to the moving cheek plate 12. The two radial directions Rb and Rc are disposed at substantially 120° relative to each other.

Conversely, the guide 32a associated with the locking member 26a is disposed in a manner such that said locking member 26a has an axis of displacement 29a that is parallel to and offset by a distance e relative to a radial direction Ra also intersecting the pivot axis X. This radial direction Ra is also disposed at 120° relative to the two radial directions Rb and Rc.

Each guide 32a; 32b; 32c is in the form of a channel defined by two guide members 321a, 322a; 321b, 322b; 321c, 322c between which the corresponding locking member slides with a certain amount of operating clearance necessary to prevent said locking member from jamming in its guide while the cam 38 is pivoting in the angular direction 27.

Figure 5A:
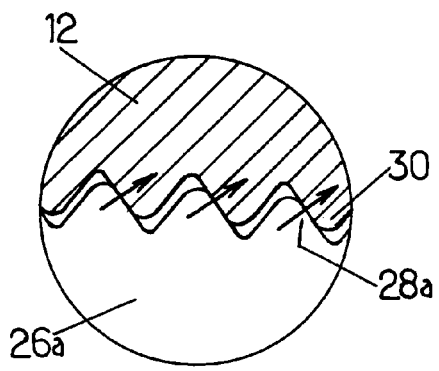
FIGS. 5a and 5b are enlarged views showing how the sets of teeth on the locking members engage in the set of teeth on the second cheek plate of the hinge mechanism of the invention.

This offset between the axis of displacement 29a of the locking member 26a and the radial direction Ra is not achieved by angularly offsetting the axis of displacement 29a relative to the radial direction Ra, but rather by shifting said axis of displacement in translation relative thereto. As can be seen in FIG. 5a, this offset prevents the set of teeth 28a on the locking member 26a from ever coming to mesh fully with the set of teeth 30 on the moving cheek plate 12. Thus, the set of teeth 28a on the locking member 26a, which set of teeth forms a circular arc, is no longer centered on the pivot axis X, unlike the set of teeth 30 on the moving cheek plate 12. As can be seen in FIG. 5a, this offset between the axis of displacement 29a and the radial direction 28a results in the teeth in the set of teeth 28a exerting thrust against the sides of the teeth in the set of teeth 30 on the moving cheek plate under drive from the cam 38 pivoting. This thrust from the teeth in the set of teeth 28b against the set of teeth 30 causes the locking member 26a to come into abutment against its guide 32a and more precisely against the guide member 321a, thereby taking up the operating clearance that exists between said guide 32a and the locking member 26a, and that initially enables said locking member 26a to move.

Figure 5B:
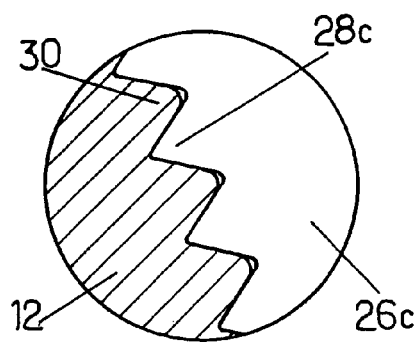

In addition, the thrust exerted by the teeth in the set of teeth 28a on the teeth in the set of teeth 30 on the moving cheek plate 12 also causes the locking members 26b and 26c to come into abutment against their respective guides 32b and 32c, and more precisely against the corresponding guide members 322b and 322c. As can be seen in FIG. 5b, when the cam 38 is in its rest position, the sets of teeth 28b and 28c on the locking members 26b and 26c engage fully in the set of teeth 30 on the moving cheek plate 12. This full engagement thus causes the thrust exerted on the set of teeth 30 by the set of teeth 28a to put the other locking members 26b and 26c into abutment against respective ones of guide members 322b and 322c, thereby taking up the operating clearance initially existing between the locking members 26b and 26c, and the respective guides 32b and 32c.

The distance e between the axis of displacement 29a and the radial direction Ra is preferably greater than the operating clearance existing between said guide 32a and the locking member 26a while being less than or equal to the distance between two adjacent teeth in the set of teeth 30 on the moving cheek plate 12.

This hinge mechanism thus makes it possible to take up the operating clearance in the moving cheek plate 12 and in the fixed cheek plate 10 while having only one slug or locking member 26a that has its set of teeth partially engaged in the set of teeth 30 on the moving cheek plate 12, thereby imparting maximum strength to said hinge mechanism.

Naturally, the hinge mechanism may also be equipped with four locking members, one of which is offset relative to a radial direction, while the other three locking members are mounted to slide along radial directions that form angles of 90° relative to one another.

Similarly, the hinge mechanism may be equipped with two locking members, one of which is offset relative to a given diameter, while the other locking member is mounted to slide in its guide along an axis of displacement that coincides with said given diameter.

What is claimed is:

1. A hinge mechanism for a vehicle seat, said hinge mechanism comprising:
   first and second cheek plates mounted to pivot relative to each other about a common pivot axis, the second cheek plate being provided with a first set of teeth forming at least an arc of a circle centered on the pivot axis;
   N locking members, each of which is provided with a second set of teeth having an angular pitch identical to the angular pitch of the first set of teeth, each locking member being mounted to move on the first cheek plate between firstly an active position in which the second set of teeth of each locking member is in engagement with the first set of teeth of the second cheek plate so as to prevent the first and second cheek plates from moving relative to each other, and secondly a retracted position in which the second set of teeth of each locking member does not co-operate with the first set of teeth of the second cheek plate so as to enable the first and second cheek plates to pivot relative to each other;
   N guides secured to the first cheek plate, each guide being associated with a locking member and serving to guide said locking member with operating clearance, said locking member following an axis of displacement that is substantially rectilinear between the active and the retracted positions; and
   a control device adapted to place the N locking members either in the active position, or in the retracted position;
   wherein (N-1) guides are disposed in a manner such that the (N-1) locking members that are associated with them move along (N-1) respective axes of displacement that coincide with (N-1) radial directions which intersect the pivot axis, and wherein the last guide is disposed in a manner such that the locking member that is associated with it moves along an axis of displacement that is parallel to and offset relative to a radial direction that intersects the pivot axis.

2. A mechanism according to claim 1, in which the (N-1) radial directions associated with the (N-1) guides and the radial direction parallel to the axis of displacement of the last guide are uniformly angularly distributed about the pivot axis.

3. A mechanism according to claim 1, in which the radial direction and the axis of displacement that are mutually parallel and that are associated with the last guide are separated by a distance greater than the operating clearance existing between said last guide and the locking member that is associated therewith.

4. A mechanism according to claim 1, in which the radial direction and the axis of displacement that are mutually parallel and that are associated with the last guide are separated from each other by a distance no greater than the distance between two adjacent teeth in the first set of teeth of the second cheek plate.

5. A mechanism according to claim 1, in which the control device comprises:
   a rotary cam which is resiliently urged towards a rest position in which said cam places each locking member in the active position; and
   a control plate which is secured to the cam and which covers each locking member at least in part, said control plate being provided with cutouts adapted to co-operating with projecting pegs provided on each locking member in a manner such as to move each locking member simultaneously towards the retracted position when the cam is moved into an actuating position.

6. A vehicle seat comprising a seat proper and a seat back mounted to pivot relative to the seat proper by means of at least one hinge mechanism according to claim 1.

\* \* \* \* \*